United States Patent [19]
Michaels et al.

[11] Patent Number: 5,877,572
[45] Date of Patent: Mar. 2, 1999

[54] REDUCED NOISE RELUCTANCE MACHINE

[75] Inventors: Paul G. Michaels, Arnold; Barry M. Newberg, Florissant; Marshall J. Huggins, Kirkwood; Vernon E. Kieffer, St. Louis, all of Mo.

[73] Assignee: Emerson Electric Co., St. Louis, Mo.

[21] Appl. No.: 725,007

[22] Filed: Oct. 1, 1996

[51] Int. Cl.⁶ ............................ H02K 11/00; H02K 5/10; H02K 5/00
[52] U.S. Cl. .............................. 310/179; 310/51; 310/71; 310/88; 310/89; 310/91
[58] Field of Search ................................ 310/51, 71, 260, 310/270, 89, 91, 258, 259, 254, 214, 43, 88

[56] References Cited

U.S. PATENT DOCUMENTS

| | | | |
|---|---|---|---|
| Re. 34,609 | 5/1994 | Mueller | 318/254 |
| 747,698 | 12/1903 | Geisenhoner | 310/214 |
| 1,279,810 | 9/1918 | Williamson . | |
| 3,866,070 | 2/1975 | Madsen | 310/214 |
| 4,037,312 | 7/1977 | Deis | 29/598 |
| 4,147,946 | 4/1979 | Linscott, Jr. et al. | 310/214 |
| 4,213,070 | 7/1980 | Lund et al. | 310/71 |
| 4,249,116 | 2/1981 | Hieda | 318/254 |
| 4,253,053 | 2/1981 | Ray et al. | 318/254 |
| 4,427,910 | 1/1984 | Richter et al. | 310/214 |
| 4,447,771 | 5/1984 | Whited | 318/661 |
| 4,488,101 | 12/1984 | Studtmann | 318/800 |
| 4,500,824 | 2/1985 | Miller | 318/701 |
| 4,523,117 | 6/1985 | Daniels | 310/71 |
| 4,661,756 | 4/1987 | Murphy et al. | 318/701 |
| 4,670,696 | 6/1987 | Byrne et al. | 318/701 |
| 4,691,038 | 9/1987 | MacMinn | 318/696 |
| 4,712,050 | 12/1987 | Nagasawa et al. | 318/254 |
| 4,761,580 | 8/1988 | Hein et al. | 310/214 |
| 4,859,921 | 8/1989 | Archer | 318/599 |
| 4,868,477 | 9/1989 | Anderson et al. | 318/696 |
| 4,933,621 | 6/1990 | MacMinn et al. | 318/696 |

(List continued on next page.)

FOREIGN PATENT DOCUMENTS

| | | | |
|---|---|---|---|
| 0 557 811 A1 | 9/1993 | European Pat. Off. | H02P 6/02 |
| 3008937A | 9/1981 | Germany | H02K 3/46 |
| 0 307 663 A | 3/1989 | Germany | H02K 1/26 |
| 3905997A | 8/1990 | Germany | H02K 19/06 |
| 4 036 565 A1 | 5/1992 | Germany | H02P 8/00 |
| 60-170435A | 9/1985 | Japan | H02K 3/487 |
| 2 167 253 | 5/1986 | United Kingdom | H02P 6/00 |
| 2 167 910 | 6/1986 | United Kingdom | H02K 1/06 |
| WO 94/28618 | 12/1994 | WIPO | H02P 6/02 |

OTHER PUBLICATIONS

International Search Report dated Jan. 28, 1998 for PCT/US97/16571 of Sep. 17, 1997.

Charles Pollock and Barry W. Williams, "A Unipolar Converter for a Switched Reluctance Motor," *Conference Record of the 1988 IEEE Industry Applications Society Annual Meeting*, pp. 44–49, Pittsburg, Pennsylvania, Oct. 2–7, 1988.

C. Y. Wu and C. Pollock, "Analysis and Reduction of Vibration and Acoustic Noise in the Switched Reluctance Drive," *IEEE Transactions on Industry Applications*, vol. 31, No. 1 pp. 91–98, Jan./Feb. 1995.

F. Blaabjerg et al., "Investigation and Reduction of Acoustical Noise from Switched Reluctance Drives in Current and Voltage Control," Sep. 5–7 1994, Proc. ICEM '94, pp. 589–594.

(List continued on next page.)

*Primary Examiner*—Nestor Ramirez
*Assistant Examiner*—Michael J. Wallace, Jr.
*Attorney, Agent, or Firm*—Arnold, White & Durkee

[57] ABSTRACT

A reluctance machine system is provided that comprises a reluctance machine having a stator defining a plurality of stator poles, a plurality of phase windings wound around the stator poles, and a rotor defining rotor poles and inter-pole gaps. Contoured topsticks, a dust cover and an endshields are used to reduce the amount of noise in the reluctance system. A winged terminal housing is also used to allow manipulation of the terminal housing and enhance alignment while protecting critical wires.

21 Claims, 10 Drawing Sheets

U.S. PATENT DOCUMENTS

| | | | |
|---|---|---|---|
| 4,943,760 | 7/1990 | Byrne et al. | 318/701 |
| 4,973,871 | 11/1990 | Bisantz | 310/154 |
| 5,072,166 | 12/1991 | Ehsani | 318/696 |
| 5,075,610 | 12/1991 | Harris | 318/701 |
| 5,119,000 | 6/1992 | Schultz | 318/254 |
| 5,124,607 | 6/1992 | Rieber et al. | 310/214 |
| 5,140,207 | 8/1992 | Baumeister et al. | 310/83 |
| 5,144,209 | 9/1992 | Ingji et al. | 318/254 |
| 5,175,458 | 12/1992 | Lemmer et al. | 310/71 |
| 5,196,775 | 3/1993 | Harris et al. | 318/638 |
| 5,239,217 | 8/1993 | Horst | 310/51 |
| 5,239,220 | 8/1993 | Taji et al. | 310/214 |
| 5,270,603 | 12/1993 | Narumi | 310/260 |
| 5,343,105 | 8/1994 | Sakabe et al. | 310/179 |
| 5,446,359 | 8/1995 | Horst | 318/701 |
| 5,461,295 | 10/1995 | Horst | 318/701 |
| 5,487,213 | 1/1996 | Hult et al. | 29/596 |
| 5,589,752 | 12/1996 | Iwasaki et al. | 318/701 |
| 5,598,049 | 1/1997 | Meier | 310/214 |

OTHER PUBLICATIONS

C. Y. Wu and C. Pollock, "Analysis and Reduction of Vibration and Acoustic Noise in the Switched Reluctance Drive," 1993, Proceedings of the IAS '93, pp. 106–113.

S. Chan et al., "Performance Enhancemanet of Single–Phase Switched–Reluctance Motor by DC Link Voltage Boosting," Sep. 1993, IEEE Proceedings–B, Vol. 140, pp. 316–322.

Stephenson and Blake, "The Characteristics, Design and Applications of Switched Reluctance Motors and Drives," PCIM Conference & Exhibition, Jun. 21–24, 1993, Nuremberg, Germany.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

Shi–Ping Hsu et al., "Modeling and Analysis of Switching DC–to–DC Converters in Constant–Frequency Current–Programmed Mode," 1979, IEEE Power Electronics Specialists Conference, pp. 284–301.

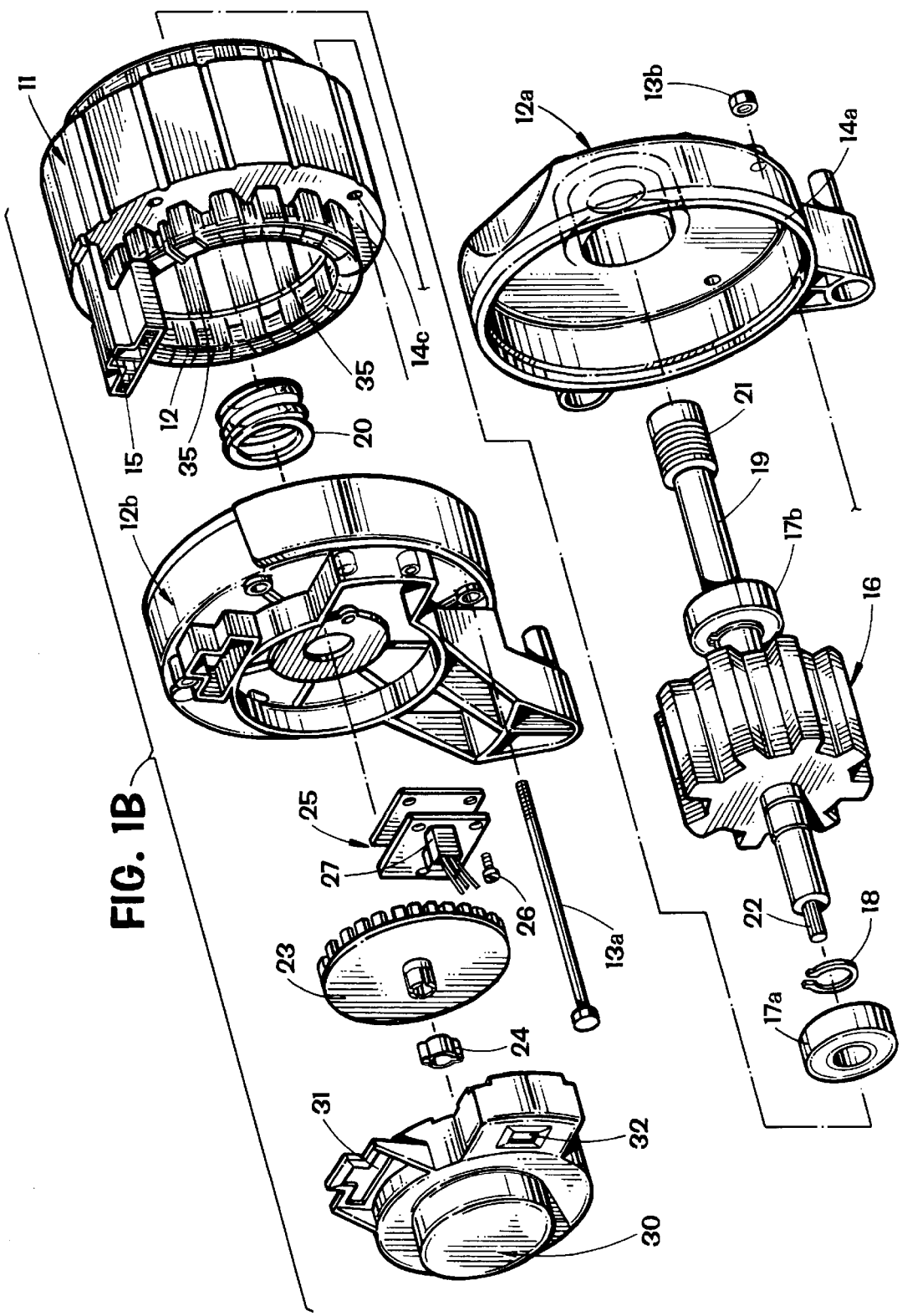

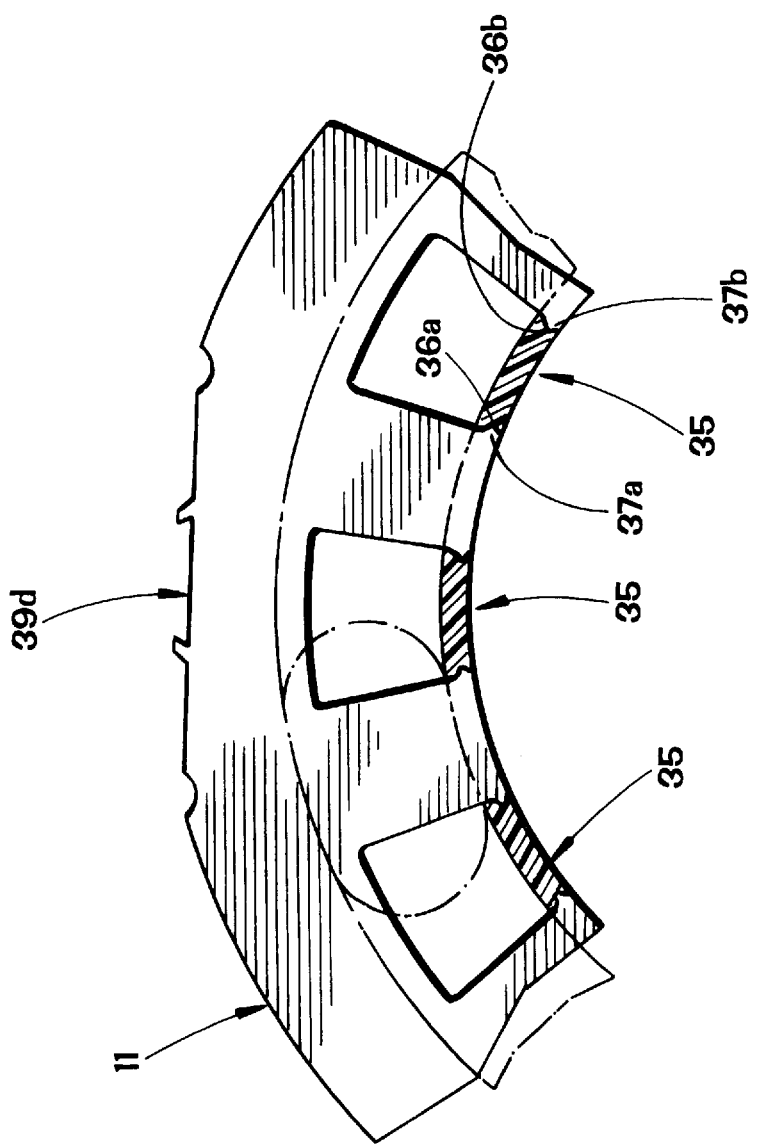

REDUCED NOISE RELUCTANCE MACHINE

FIELD OF THE INVENTION

This invention in general relates to reluctance machines and machine systems and, in particular, to switched reluctance machines and machine systems. More specifically, the present invention relates to a method and apparatus for improving the performance of a switched reluctance machine by reducing noise.

BACKGROUND OF THE INVENTION

Reluctance machines are well known in the art. In general a reluctance machine is an electric machine in which torque is produced by the tendency of a movable part to move to a position where the inductance of an excited winding is maximized (i.e. the reluctance is minimized).

In one type of reluctance machine the phase windings are energized at a controlled frequency. This type of reluctance machine is generally referred to as a synchronous reluctance machine. In another type of reluctance machine, circuitry is provided to determine the position of the machine's rotor, and the windings of a phase are energized as a function of rotor position. This type of reluctance machine is generally referred to as a switched reluctance machine. Although the description of the current invention is in the context of a switched reluctance machine, the present invention is applicable to all forms of reluctance machines, including synchronous and switched reluctance motors and to other machines that have phase winding arrangements similar to those of switched reluctance machines.

The general theory of design and operation of switched reluctance machines is well known and discussed, for example in The Characteristics, Design and Applications of Switched Reluctance Motors and Drives, by Stephenson and Blake and presented at the PCIM '93 Conference and Exhibition at Nuremberg, Germany, Jun. 21–24, 1993.

As a switched reluctance motor (or generator) operates, magnetic flux is continuously increasing and decreasing in different parts of the machine. The changing flux results in fluctuating magnetic forces being applied to the ferromagnetic parts of the machine. These forces can produce unwanted noise and vibration. One major mechanism by which these forces can create noise is the ovalizing of the stator caused by magnetic forces normal to the air-gap. Generally, as the magnetic flux increases along a given diameter of the stator, the stator is pulled into an oval shape by the magnetic forces. As the magnetic flux decreases, the stator pulls or springs back to its undistorted shape. This ovalizing and springing back of the stator will produce audible noise and can cause unwanted vibration.

In addition to the stator distortions resulting from the phenomena described above, the fluctuating magnetic forces in the motor can distort the stator in other ways, as well as distorting the rotor and other parts of the machine system. For example, distortions of the rotor can cause resonance of the rotor end-shields. These additional distortions are another potential source of unwanted vibration and noise.

Another source of undesirable noise in reluctance machines include the "siren" effect often associated with such machine. As explained above, the rotors and stators used in most reluctance machines include salient poles. The mechanical structure resulting from the placement of such a salient pole rotor within a core defined by a salient pole stator is similar in some respects to a siren and can, in some instances, produce unwanted audible noise according to the same phenomenon taken advantage by a siren to produce noise.

A still further source of unwanted noise associated with some reluctance machines is the noise that results as air is drawn into and passed through the reluctance machine during operation. During operation of many reluctance machines, the rotation of the rotor, especially at high speeds, tends to draw air into and through the cavity within which the rotor is positioned resulting in undesirable "windage" noise.

Although the problem of unwanted acoustic noise and vibration has been recognized, known control systems for reluctance motors do not adequately solve the problem. One proposed solution has been to implement complicated control techniques to carefully control the currents applied to the phase windings of the machines. Certain of such approaches are generally discussed in C. Y. Wu and C. Pollock, "Analysis and Reduction of Vibration and Acoustic Noise in the Switched Reluctance Drive," *Proceedings of the IAS '93* pp. 106–113 (1993). While these current control approaches can reduce the noise produced by a reluctance machine they are often difficult and costly to implement. Moreover, these types of reduced-noise current switching schemes constitute only one possible form of noise reduction and do not necessarily remove all of the sources of potentially unwanted noise.

It is an object of the present invention to provide for a reduced noise reluctance machine that can be easily constructed and that can operate, in isolation or in combination with reduced-noise current switching schemes to reduce the noise produced by a reluctance machine.

SUMMARY OF THE INVENTION

The present invention concerns a reduced noise reluctance machine.

In accordance with one aspect of the present invention a reduced noise reluctance machine is provided that includes a stator defining a plurality of inwardly projecting stator poles, where the projecting stator poles define inter-pole regions between the stator poles and a central bore, and where each stator pole terminates in a region defining a concave surface, where the concave surface has a given radius of curvature at least one phase winding having a winding coil that is wound about at least one of the stator poles, where portions of the winding coil are positioned in at least one inter-polar region, and where the portion of the winding coil includes an outer surface facing the central bore; and a contoured top-stick positioned within the at least one inter-polar region on the outer surface of the portion of the winding coil, wherein the contoured top-stick has an outer concave surface where the radius of curvature of the top-stick's outer surface is substantially the same as the given radius of curvature.

In accordance with another embodiment of the present invention a reduced noise reluctance machine is provided where the machine comprises a stator, the stator defining an outer surface, the stator having opposed first and second ends; and a first endshield, the endshield defining a cavity having a first surface and a second surface where the first surface is substantially perpendicular to the second surface; wherein the stator is positioned with respect to the first endshield such that the outer surface of the first end of the stator mates with both the first and second surfaces. A second, similar endshield may also be provided.

A still further aspect of the present invention relates to a terminal housing for coupling the terminal ends of a plurality of phase windings of an electric machine to a source of electric power, where the terminal housing comprises: a central portion defining a plurality of hollow cavities, the hollow cavities adapted to receive the terminal ends of the phase windings; at least one projecting leg projecting outward from the central portion in a first direction; and first and second wing members extending in opposite directions from the central portion where the first and second wing members extend in directions substantially perpendicular to the first direction. A related aspect of the present invention includes the use of the identified terminal housing in a reluctance machine.

In accordion with yet another aspect of the present invention a dust cover for a reluctance machine including a phase winding and a projecting terminal housing for connecting electric power to the phase winding is provided, wherein the dust cover includes a passage adapted to receive the terminal housing where the passage is defined by a plurality of flexible projections, separated by slits.

Other aspects of the present invention relate to the use of the top-sticks, first and second endshields and dust cover described above to construct a reduced noise reluctance machine.

Other aspects and advantages of the present invention will become apparent upon reading the following detailed description and upon reference to the drawings.

BRIEF DESCRIPTION OF THE DRAWINGS

FIG. 1B is an exploded view of a machine in accordance with the invention.

FIG. 2A–2C illustrates a topstick of a machine in accordance with the invention.

DETAILED DESCRIPTION OF THE INVENTION

Figure 1A:
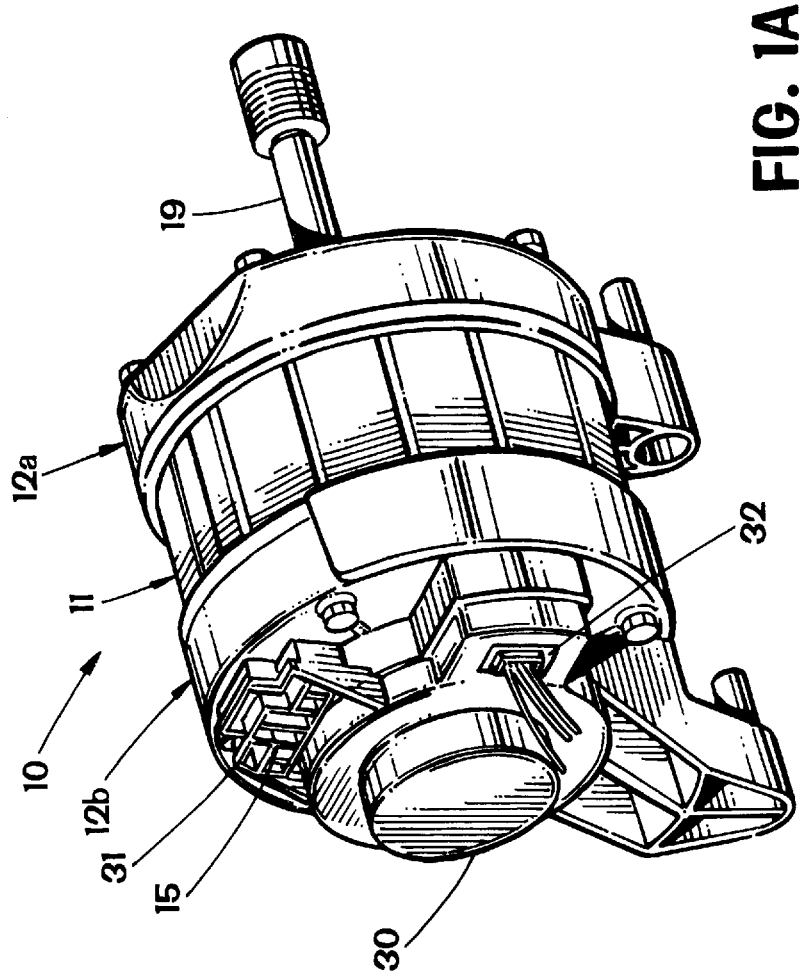
FIG. 1A illustrates one embodiment of a fully assembled machine in accordance with the invention.

FIG. 1A and 1B show an exemplary reduced noise reluctance machine 10 in accordance with the present invention is show. FIG. 1A illustrates a side view of a completely assembled machine 10 and FIG. 1B illustrates an exploded perspective view of machine 10 and its individual components.

Referring to FIGS. 1A and 1B, the reluctance machine 10 includes a central stator 11 that is comprised of a stack of substantially identical laminations of appropriate material (e.g., laminated steel). A front endshield 12a and a rear endshield 12b are positioned adjacent to and attached to the stator 11 by a number of bolts 13a and nuts 13b which pass through holes defined by the front and rear endshields 14a and 14b and through holes defined by the stator 11. Only one exemplary nut and bolt combination 13a and 13b is illustrated in FIG. 1B although it will be understood that a greater number may be required to adequately couple the front and rear endshields 12a and 12b to the stator 11.

In the embodiment of machine 10 illustrated in FIGS. 1A and 1B, the laminations of the stator 11 define a number of inwardly projecting stator poles that define a central bore. Positioned about these stator poles are a number of phase windings which may be wound in a conventional fashion. Top-sticks 35 are positioned within the inter-polar regions of the stator and are used to cover the portion of the phase windings that would otherwise be exposed to the central bore of the stator. In the exemplary embodiment of FIGS. 1A and 1B there are three phase windings, each having first and second ends, where each of the ends of the phase windings terminates in a terminal. The six terminals associated with the three phase windings of machine 10 are positioned within a winged-terminal housing 15.

A rotor assembly 16 is positioned within the central bore is defined by the inwardly projecting stator poles. In the exemplary embodiment of FIGS. 1A and 1B, the rotor assembly 16 comprises a stack of substantially identical rotor laminations that is coupled to a shaft 19. Bearing assemblies 17a and 17b are also coupled to the shaft on opposite sides of the rotor stack. The bearing assemblies 17a and 17b may be held in position by, for example, a clip mechanism such as that illustrated as element 18 in FIG. 1A.

The rotor assembly 16 fits within the central bore defined by the stator poles and is held in place by the relationship between the bearing assemblies 17a and 17b and the front and read endshields 12a and 12b. In the exemplary embodiment of FIGS. 1A and 1B, both the front and the rear endshields 12a and 12b define circular recesses that are sized to receive the bearing assemblies 17a and 17b such that, when the endshields are coupled to the stator 11, the bearing assemblies 17a and 17b will be held in place by the endshields and the rotor 16 will be held in place within the central bore of the stator 11. A compression mechanism, such as spring 20 may be used to hold the rotor assembly snugly in place.

As reflected in FIGS. 1A and 1B the front portion of shaft 19 extends through a bore defined by the front endshield 12. The front portion of the shaft includes a grooved member 21 which may be coupled to a load such that operation of the machine 10 will drive the load in an appropriate fashion.

As reflected in FIG. 1B, the rear portion of shaft 19 terminates in a smaller-diameter section 22 that passes through a bore defined by the rear endshield 12b. A shutter mechanism 23 is coupled to the smaller-diameter section 22 by a clip 24. As reflected in FIG. 1B, the shutter mechanism 23 defines a number of projecting shutter teeth.

A sensor board 25 is coupled to the rear endshield 12b by bolts or screws 26 (only one of which is illustrated in FIG. 1B). In the example of FIG. 1B, the sensor board 25 includes one or a number of optical sensors that receive the shutter teeth of shutter mechanism 23 and generate signals which provide an indication of the angular position of the rotor with respect to the stator. The leads that carry the rotor position signals are coupled to output wires at a plug 27 which extends from sensor board 25.

One preferred method for positioning shutter 23 with respect to the rotor 16, and one preferred arrangement of the shutter mechanism 23 and sensor board 24 is described in co-pending, commonly-assigned, patent application Ser. No. 08/724,690, entitled "METHOD AND APPARATUS FOR ALIGNING A ROTOR POSITION TRANSDUCER" by Barry M. Newberg (Our File EMCA:002), filed on Oct. 1, 1996, the specification and disclosure of which is incorporated by reference.

A dust cover 30 is positioned over the shutter mechanism 23 and sensor board 25 and coupled to rear endshield 12b by way of a simple interlocking arrangement whereby the dust cover 30 includes small projections that "snap" into recesses in the rear endshield 12b. In the exemplary embodiment of FIGS. 1A and 1B the dust cover 30 is constructed of flexible plastic such that it may be easily removed and attached to the rear end-shield 12b.

The dust cover 30 defines first and second slitted regions 31 and 32. A portion of winged-terminal housing 15 extends through the first slitted region 31 and a portion of plug 27 extends through the second slitted region.

As explained in greater detail below, there are a number of features of machine 10 that tend to reduce the amount of noise generated by the machine during normal operation. Specifically, the construction of the top-sticks 35, the front and rear end-shields 12a and 12b, the use of terminal housing 15, and plug 27 and dust cover 30 all tend to reduce the noise level associated with machine 10 during normal operation.

One specific feature of machine 10 that tends to reduce the noise output of the machine is the construction and placement of the topsticks 35 within the inter-polar regions of the stator 11. This feature of the present invention is illustrated in greater detail in FIGS. 2A–2C.

Figure 2A:
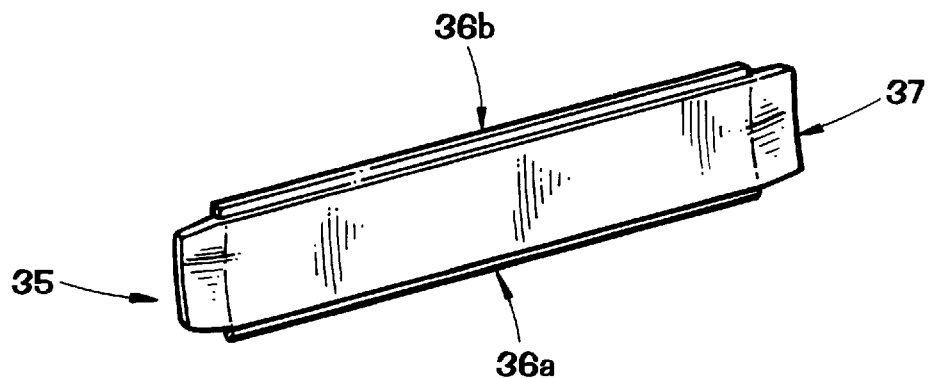

FIG. 2A illustrates in greater detail an exemplary topstitck 35 constructed according to various aspects of the present invention. The topstitch 35 in FIG. 2A comprises a topstick 35 having a length corresponding generally to the thickness of the stator 11. The topstick 35 has a central region of a first thickness and two opposed lateral regions 36a and 36b, where the thickness of the lateral regions is less than the thickness of the central regions. In the specific embodiment of topstick 35 illustrated in FIGS. 2A–2C, the lateral regions 36a and 36b define slight indented notches. This is better illustrated in FIG. 2C which provides a cross-sectional view of several topsticks 35.

Figure 2B:
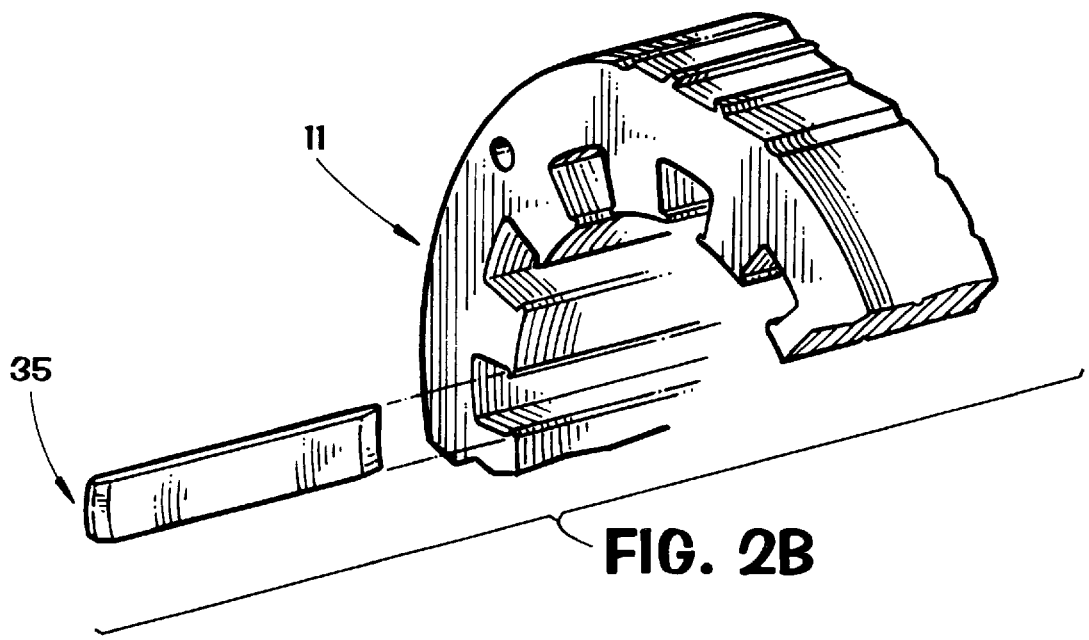

As reflected in FIG. 2B, topstick 35 may be inserted into the inter-pole regions of stator 11 to cover the portion of the phase winding positioned within that inter-pole region that would otherwise be exposed. One exemplary system for positioning and holding topstick 35 in place with respect to stator 11 is illustrated in FIG. 2C. As illustrated in FIG. 2C, the stator each of the projecting poles of the stator 11 defines small extending tangs 37 such that each inter-pole region is associated with one tang 37a from one stator pole and a second tang 37b from another stator pole. The topstick 35 may be placed in the inter-pole region such that the tangs 37a and 37b fit within the notches 36a and 36b to hold the topstick 35 in place. In the illustrated embodiment, the topstick 35 sits "on top" of the magnet wire positioned within the appropriate inter-pole region such that the magnet wire pushes on the topstick 35 and provides a compressive force which helps hold the topstick 35 in place.

Those of ordinary skill in the art having the benefit of this disclosure will appreciate that the use of tangs 37a and 37b and notches 36a and 36b are but one exemplary method for coupling the topsticks 35 to the stator 11.

Topstick 35 defines an interior surface 37 that is not flat but instead is contoured such that it curves according to a radius that is substantially equal to the radius associated with the curvature of the stator poles. This is reflected in FIG. 2C where the inner radius defined by the stator poles and the interior surface 37 of the topsticks is substantially constant.

It has been determined that the use of topsticks 35 having an appropriately contoured interior surface 37 results in a reluctance machine that is less noisy than a similar reluctance machine that does not have any topsticks or that has topsticks with flat (i.e., non-contoured) interior surfaces. It is believed that a machine having a central stator bore with a substantially constant radius will tend to retard the previously describe "siren" effect and also tend to reduce the "windage" noise that would otherwise be produced as the salient pole rotor 16 rotated passes the salient pole stator 11. Thus, the contoured topsticks 35 constitute one significant noise-reducing feature of machine 10.

Another feature of machine 10 that is believed to significantly reduce the amount of noise produced by the machine concerns the construction and design of the front and rear endshields 12a and 12b. In particular, the front and rear endshields 12a and 12b are constructed such that they define an inner edge that has a varying thickness to contour to the outside shape of the stator 11. When the front and rear endshields 12a and 12b are secured to the stator 11, this contoured inner edge mates with the outer edge of the stator 11, thus inhibiting the flow of air to/from the central bore defined by the stator 11 from/to the environment outside the motor. This inhibition of such airflow tends to significantly reduce the amount of acoustic noise that would otherwise be produced by machine 10 during normal operation. This aspect of the present invention is further illustrated in FIGS. 3A–3C.

Figure 3A:
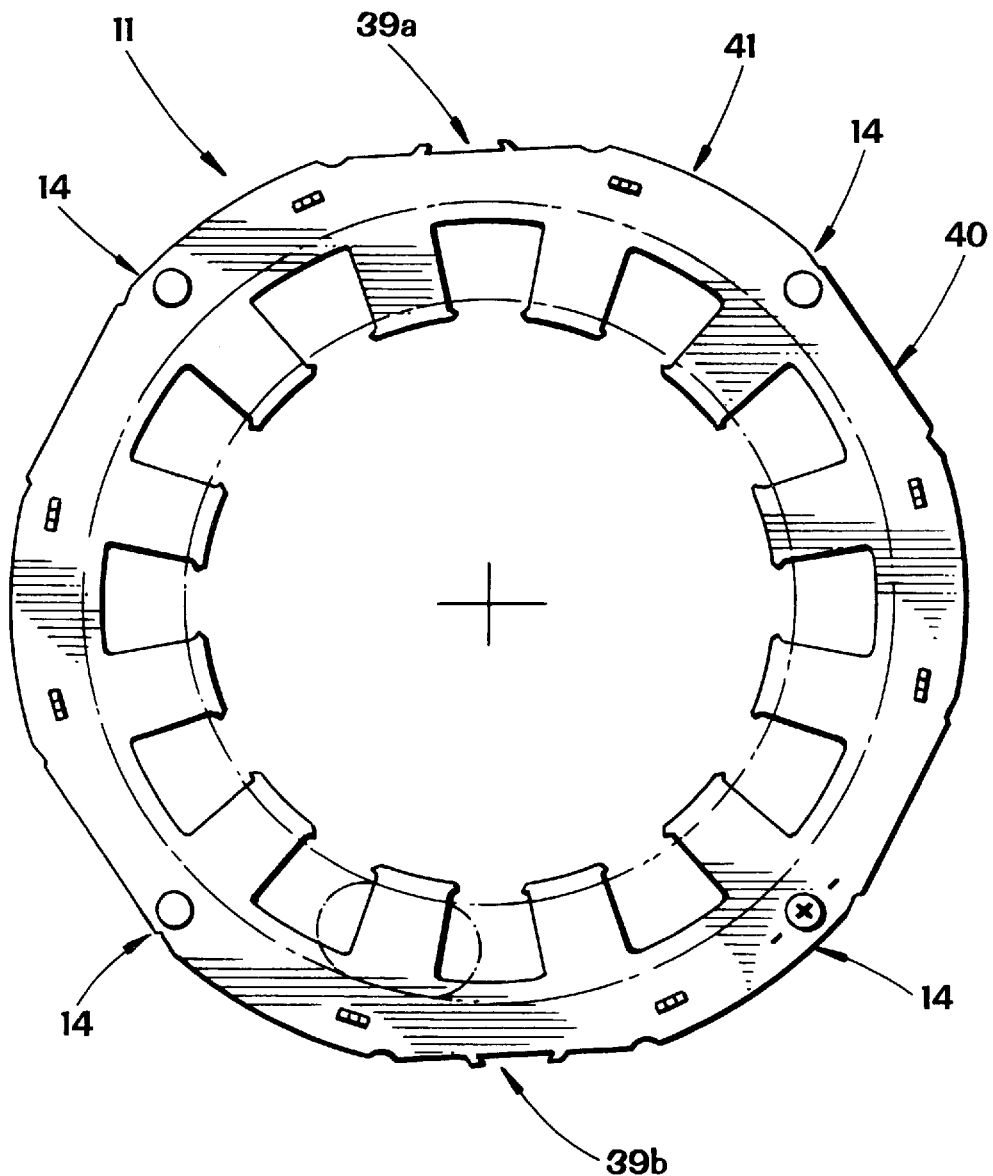
FIG. 3A is a cross section of the stator of a machine in accordance with the invention.

Turning to FIG. 3A, a cross section of the stator 11 is provided. The previously described bore 14c that receive the bolts that are used to secure the endshields 12a and 12b to the stator 11 are clearly illustrated in the figure.

As reflected in FIG. 3A, the stator 11 does not have a smooth, continuous outer surface, but instead has an outer surface that has a number of jagged features such as notched regions 39a and 39b, regions having a substantially "flat" outer profile 40 and regions having a substantially curved or rounded outer profile 41.

To accommodate the varying outer surface of the stator 11 the front and read end-shields 12a and 12b are designed such that the portion of the end-shields that receives the stator 11 is contoured to closely follow the outer surface of stator 11 such that the endshields 12a and 12b smoothly mate with the stator 11. In addition to being designed to accommodate the varying outer surface of stator 11, the endshields are constructed to provide for a "ledge" surface that is designed to receive the stator 11 such, when the machine 10 is positioned such that the shaft 19 extends horizontally, a horizontal portion of the ledge surface mates with a horizontal surface of the stator 11 and a vertical portion of the ledge surface mates with a vertical portion of stator 11. This aspect of the present invention is reflected in greater detail in FIGS. 3B and 3C.

Figure 3B:
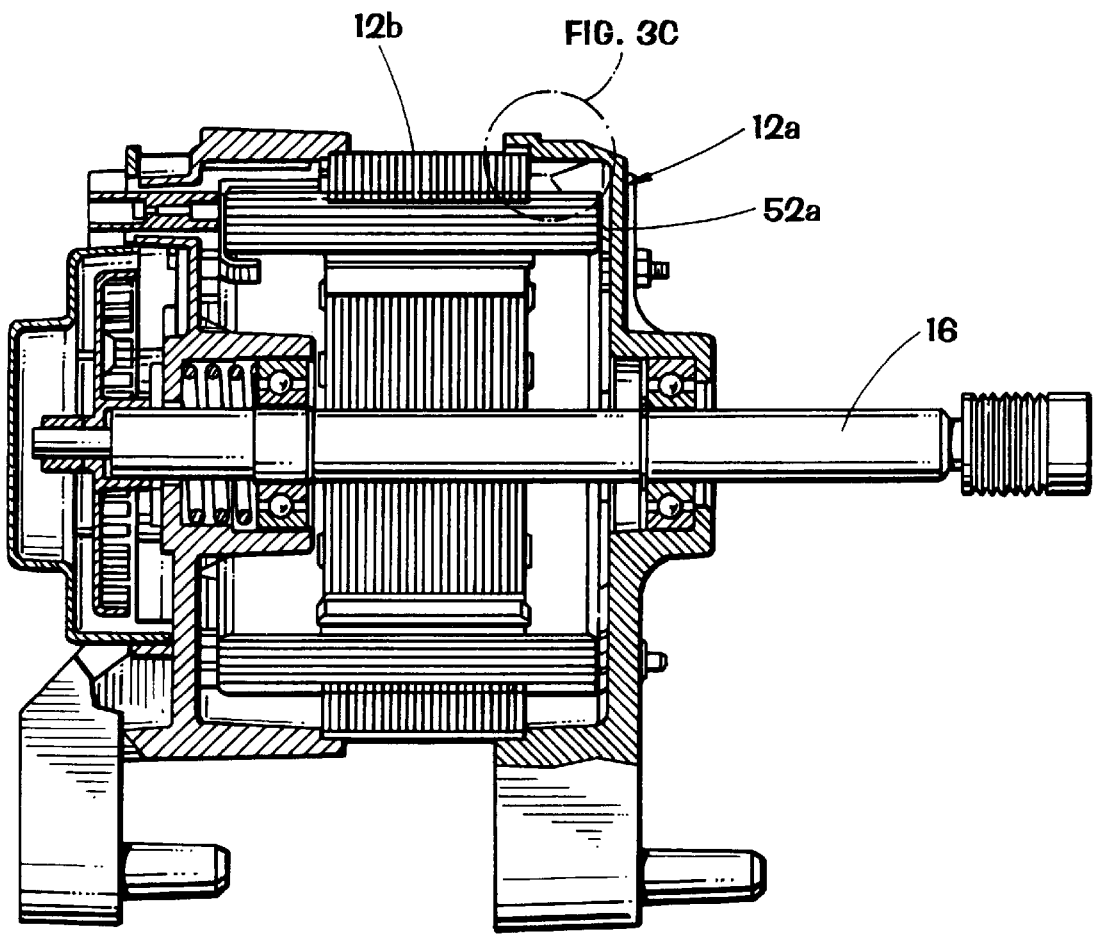
FIGS. 3B and 3C illustrate a side cross sectional view of a machine in accordance with the invention.
Figure 3C:
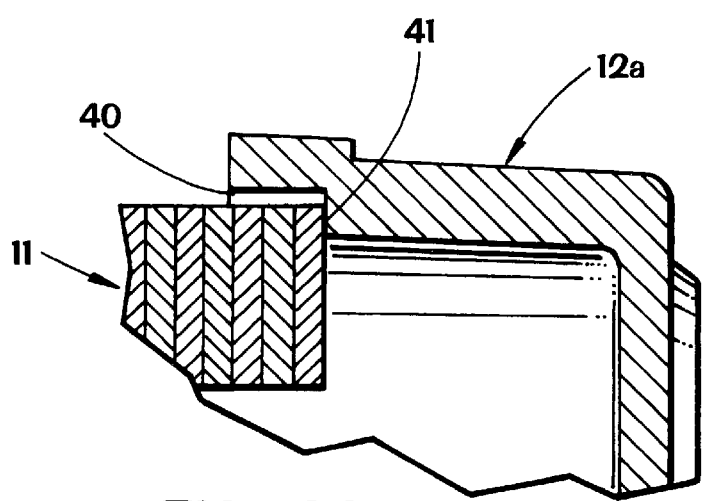

FIG. 3B illustrates a side cross-sectional view of machine 10. FIG. 3C illustrates a close-up of the portion of FIG. 3B enclosed in the dashed circle. As reflected in the figure, the stator 11 is positioned between the front and rear end-shields 12a and 12b in such a manner that that a portion of the stator mates with horizontal surfaces provided by the end-shields and a portion of the stator mates with vertical surfaces provided by the end-shields. As explained above, these horizontal and vertical surfaces are carefully contoured to match the outer surfaces of the stator 11.

FIG. 3C illustrates an exemplary mating between the stator 11 and end-shield 12a. As reflected in the figure, a portion of the stator 11 mates with a horizontal surface 40 of end-shield 12b, while a portion of stator 11 mates with a vertical surface provided by end-shield 12b.

Because of the close fit between the end-shields 12a and 12b and the stator 11, and because the mating of the end-shields to the stator 11 occurs at contoured horizontal surfaces and contoured vertical surfaces, the amount of air drawn in or expelled by machine 10 during normal operation is greatly reduced. This reduction in such air flow contributes to the noise reduction of machine 10. Moreover, the acoustic barrier established by the mating of the stator 11 to the end-shields 12a and 12b tends to block acoustic noise generated within the stator bore from reaching the external environment thus further reducing the environmental noise generated by machine 10.

A further aspect of the present invention which contributes significantly to the reduction of noise produced by machine 10 relates to the use of dust cover 30 and the interaction of end-shield 30 with winged-terminal housing 15 and sensor board plug 27. In particular, the dust cover 30 is designed to be secured to the rear-endshield 12b to further restrict the flow of air to/from the central bore of the stator as machine 10 operates and to restrict the transmission of acoustic noise from the central bore to the external environment. Further, the dust cover 30 has slotted regions 31 and 32 that are surrounded by inwardly projecting flexible members that receive and engage the winged-terminal housing 15 and the sensor board plug 27 to inhibit the flow of air and the transmission of acoustic noise through the slotted regions and to hold and position the plug 27 and terminal housing 15 in place. Details concerning this aspect of the present invention are reflected in FIGS. 4A–4D and FIG. 5.

Figure 4A:
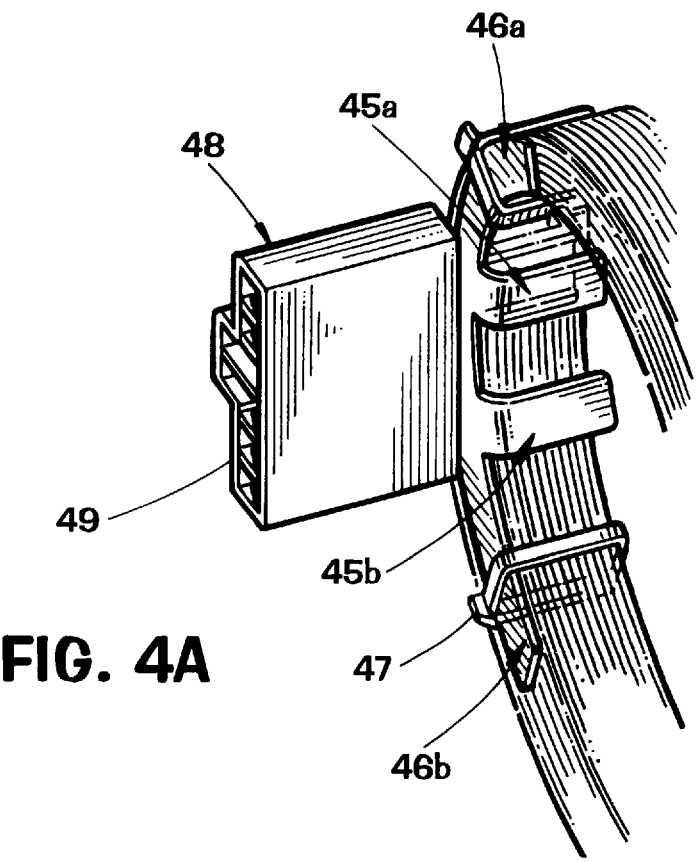
FIGS. 4A–4B illustrates a winged-terminal housing of a machine in accordance with the invention.

Turning to FIG. 4A, the winged-terminal housing 15 is illustrated as secured to the stator 11. The winged-terminal housing 15 is flexible and is formed of a suitable material (e.g., plastic). The winged terminal housing 15 includes two projecting "legs" 45a and 45b which are sized to fit within the inter-pole gap between two of the stator poles. The two projecting legs help position the winged-terminal housing 15 with respect to the stator.

Winged-terminal housing 15 also includes to outwardly extending wings 46a and 46b which extend from a central portion 48 of the winged-terminal housing 15. The outwardly extending wings 46a and 46b from a surface by which the winged-terminal housing 15 may be affixed to the stator 11. In the embodiment illustrated in FIG. 4A, the winged-terminal housing 15 is affixed to the stator by plastic ties (one of which is illustrated as element 47) which pass over an extending wing 46b and down through and around one of the coils that comprise the phase windings.

A central portion 48 extends in a direction generally perpendicular to the plane formed by the extending wings 46a and 46b when arranged as illustrated in FIG. 4A. In the exemplary embodiment of FIG. 4A, the central portion 48 defines six separate passages that receive the six ends of the phase windings placed within stator 11. These six phase windings may terminate in snap-on terminals such that an appropriate plug (not illustrated) can mate with winged-terminal housing 15 so as to electrically connected the phase windings to appropriate control circuitry.

Although it is not visible in the view of FIG. 4A, winged-terminal housing 15 includes a projecting positioning tab 50 which allows winged-terminal housing 15 to be properly aligned with stator 11 during manufacturing. Positioning tab 50 is generally illustrated in FIG. 4B which illustrates winged-terminal housing 15 from an angle different from that illustrated in FIG. 4A.

Figure 4B:
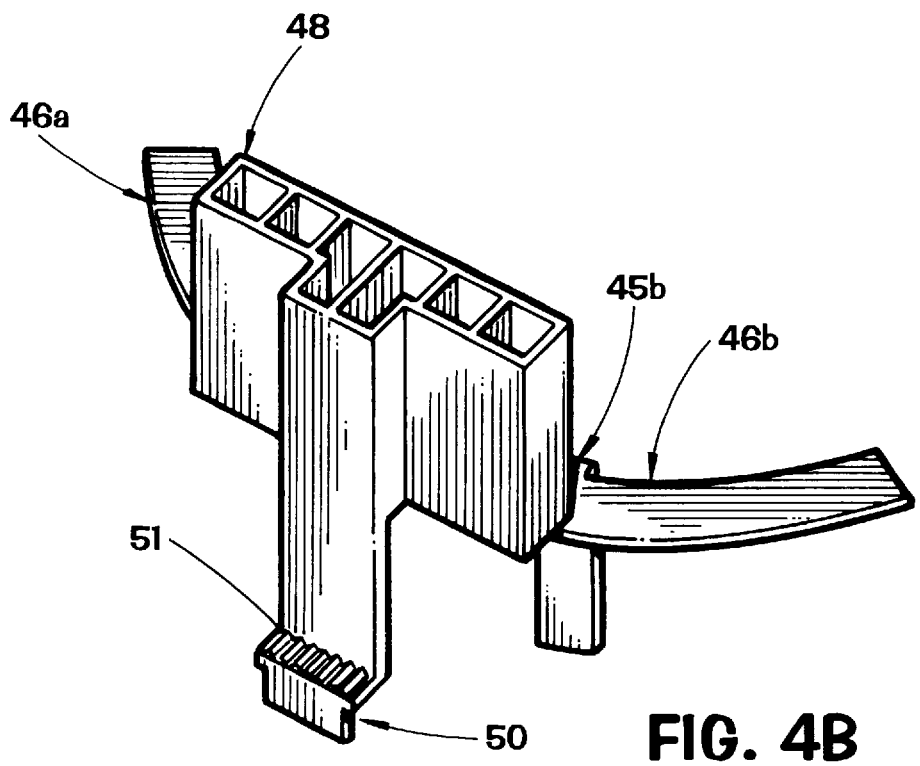

Referring to FIG. 4B, the positioning tab 50 comprises a projecting tab that terminates in a noted portion that defines two mating surfaces, each substantially perpendicular to the other. The length of projecting tab 50 corresponds generally to the distance that exists between one edge of the stator 11 and the outer portion of the end-turns of the phase windings that extend beyond the stator 11. Thus, the projecting tab 50 may be used to properly position the winged-terminal housing 15 at one location with respect to the stator 11.

Figure 4C:
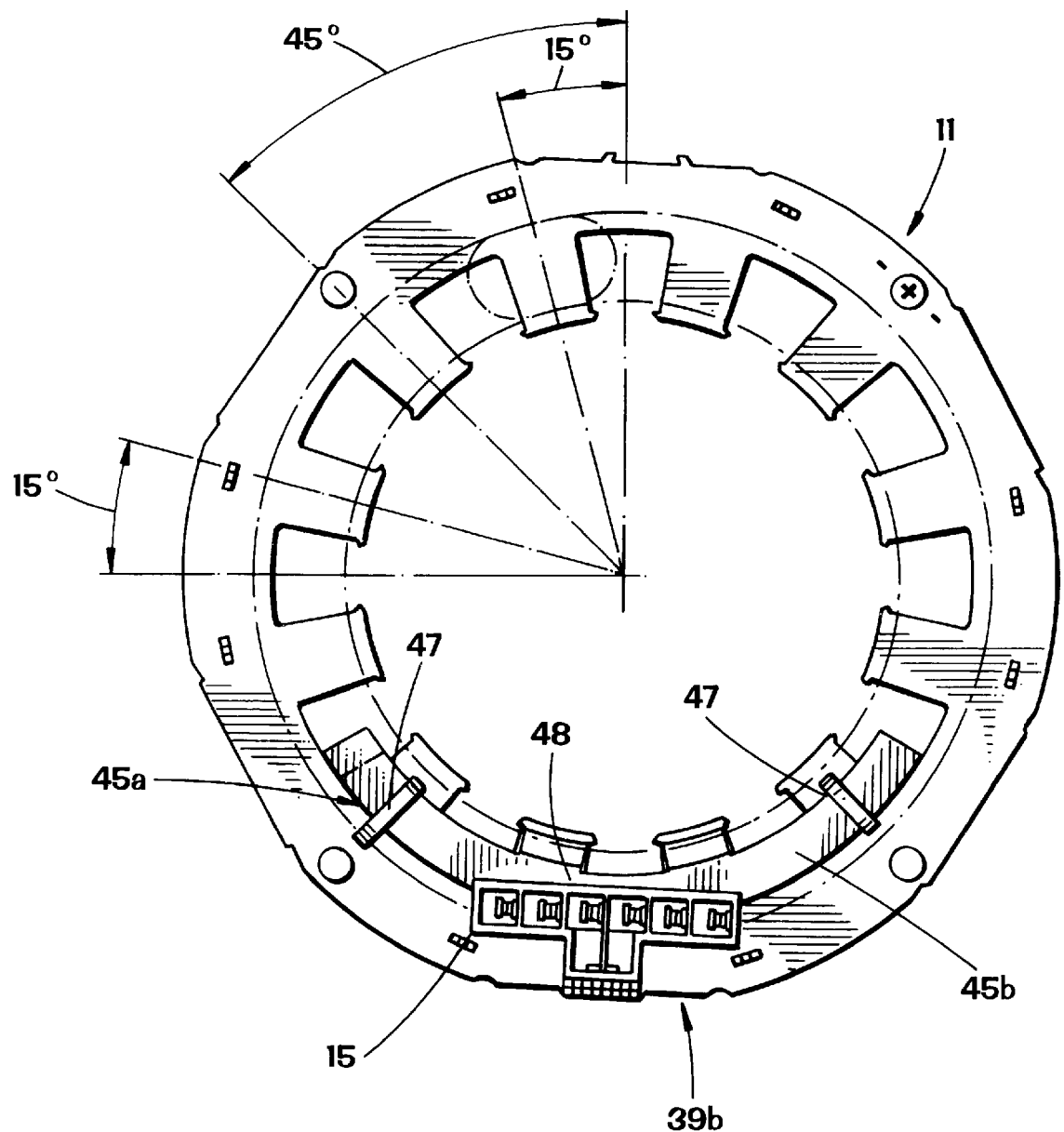
FIG. 4C illustrates a cross section of a stator.
Figure 4D:
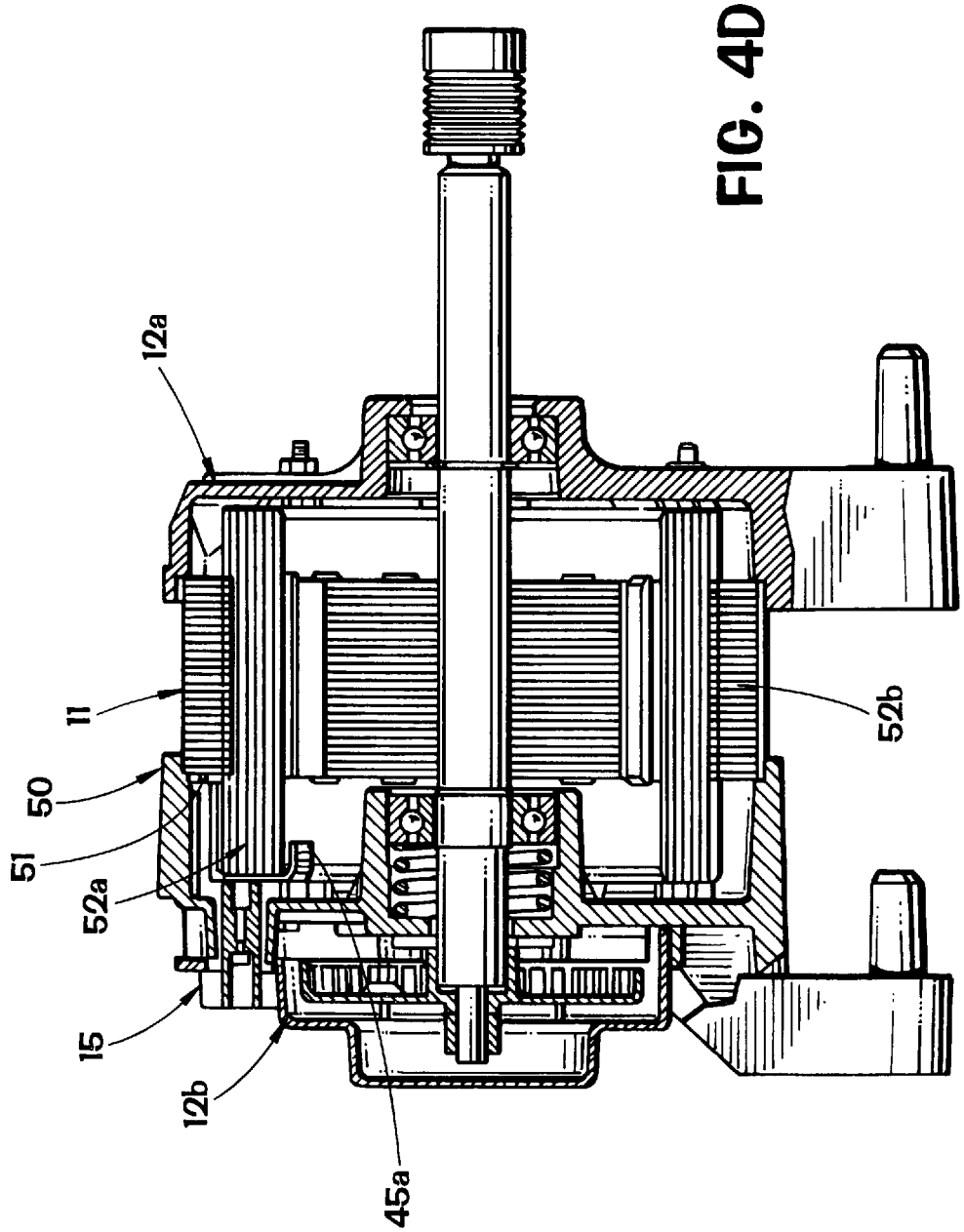
FIG. 4D illustrates side cross sectional view of a portion of a machine in accordance with the invention.

In the embodiment illustrated in FIG. 4D, the projecting tab 50 defines a plurality of outwardly extending crush ribs 51 that extend upward from one of the two mating surfaces defined by tab 50. As explained in more detail below, these crush ribs absorb some of the tolerances that may occur during motor assembly.

The projecting positioning tab 50 is sized to fit within the notched regions 39a and 39b defined by the stator 11 (see FIG. 3A) such that it can further position the winged-terminal housing 15 with respect to the stator. This aspect of the winged terminal housing is illustrated in greater detail in FIGS. 4C and 4D.

FIG. 4C illustrates a view similar to that of FIG. 3B of a cross-section of the stator 11. The figure further illustrates the manner in which the winged-terminal housing 15 may be positioned with respect to the stator 11 by aligning the projecting positioning tab 50 of winged-terminal housing 15 with the notched region 39b of stator 11.

FIG. 4D illustrates a side cross sectional view of a portion of machine 10. Stator 11 is illustrated, as are front and rear endshields 12a and 12b. Also illustrated are coil sets 52a and 52b that form the phase windings. As may be noted, the coil sets 52a and 52b extend outside of the stator 11. Winged-terminal housing 15 is positioned next to one set of end-turns for the coil set 52a. As may be noted the central portion 48 rests above the end-turns of the coil and the winged-projections 46a and 46b extend across the surface of the end-turns. The leg projections 45a and 45b are also illustrated as extending into and around the stator coil set 52a. As also reflected in FIG. 4D, the positioning tab 50 extends from the plane formed by the end-turns of the coil set 52a to the stator 11 such that the end portion of the tab 50 engages the stator 11. Through this engagement, the tab 50 ensures that the winged-terminal housing 15 is maintained in proper position. As reflected in FIG. 4D, the endshield 12b abuts the notch defined by tab 50 and will tend to deform (or crush) the crush ribs 51. This deformation of the crush ribs 51 will tend to compensate for minor tolerances in the manufacture of the endshield 12b to allow for a better fit between the endshield and the stator stack. This tight fit serves to reduce the amount of acoustic noise produced by the exemplary motor of the present invention.

Winged-terminal housing 15 allows for both rapid connection of an electrical controller to the phase windings of machine 10 and for simple and efficient construction of the machine 10. Specifically, because of the flexible nature of winged-terminal housing 15 and the non-rigid manner in which wing-terminal housing 30 is affixed to the stator 11 and coil set 52a, the winged-terminal housing may be moved about during assembly without affecting the connection between the winged-terminal housing 15 and the stator 11 and coils 52a.

Referring back to FIGS. 1A and 1B it may be observed that the central portion 48 of the winged-terminal housing 15 extends through an appropriately sized opening in the rear end-shield 12b. The central portion 48 is then received by a slotted opening 31 in dust cover 30. The specific manner in which the dust cover 30 receives the central portion 48 of winged-terminal housing 15 contributes to the noise reduction properties of the machine 10. Details of the construction of dust cover 30 that are relevant to this aspect of the present invention are reflected in FIG. 5.

Figure 5:
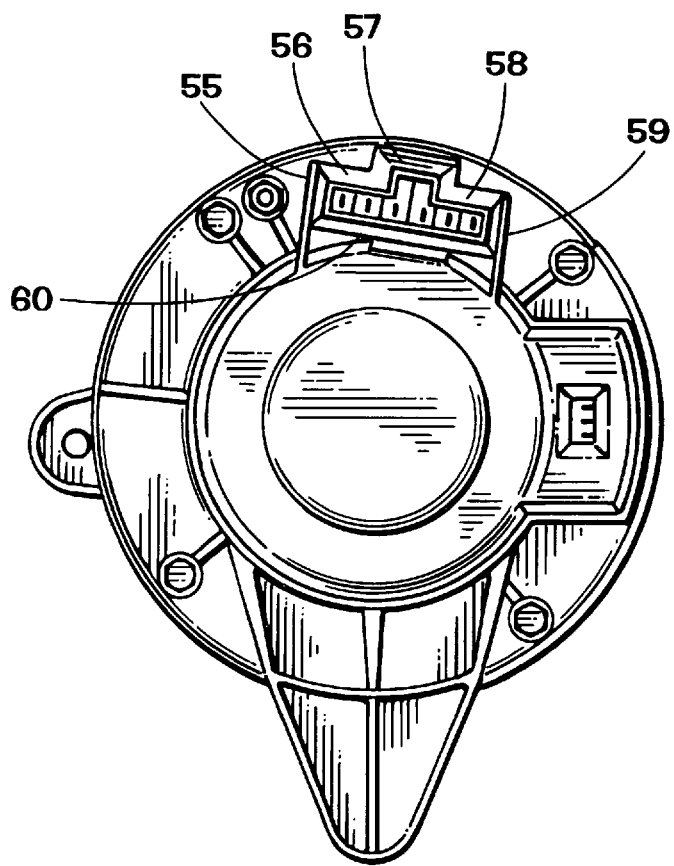
FIG. 5 is a detailed view of a dustcover for a machine in accordance with the invention.

FIG. 5 illustrates a frontal view of rear end-shield 12b and dust cover 30. Specifically visible in FIG. 5 are the slotted openings 31 and 32 that are defined by the dust cover 30. Focusing on slotted opening 31 it may be noted that the opening 31 consists of an external support region, reflected by the dark line 55 and six inwardly projecting portions 56–61 that are separated from one another by slits. Thus, each of the six inwardly projecting slits defines a slotted opening. In the specific embodiment of FIG. 5, the external support region defined by line 55 has the same shape as, and is just slightly larger than, the cross-section of central region 48 of winged-terminal housing 15. The inwardly projecting portions 56–61 are formed of a flexible material (e.g., thin plastic) and project such that they form a opening 62 that has the same general shape as, but is smaller than, the cross-section of central region. Thus, when the dust cover 30 is placed over the central portion 48 and snapped to rear end-shield 12b, the central portion 48 of wing-terminal housing 15 will pass through the opening 62 and deform the projecting portions 56–61 upwards such a seal is formed between the projecting portions 56–61 and the central portion 48 of winged-terminal housing 15. This seal serves two functions in that: (i) it helps to maintain the winged-terminal housing 15 in proper position and; (ii) it serves to limit the flow of air into/from the central portion of the stator during operation and to inhibit the transmission of acoustic noise from the interior of machine 10 to the environment.

As FIG. 5 illustrates slotted region 32 is like slotted region 31 except that slotted region 32 is defined by four projecting portions 62–66 that define an opening that has the same shape as, but is slightly smaller than, the central portion of plug 27. The function and operation of the slotted region 32 is similar to that previously described for slotted region 31.

The above description of several exemplary embodiments is made by way of example and not for purposes of limitation. Many variations may be made to the embodiments and methods disclosed herein without departing from the scope and spirit of the present invention and se of such alternate configurations will not depart from the scope of the present invention. Illustrative embodiments of the invention are described below as it might be employed in the construction of a reduced noise reluctance system.

Moreover, in the interest of clarity, not all features of an actual implementation are described in this specification. It will of course be appreciated that in the development of any such actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

The present invention is intended to be limited only by the scope and spirit of the following claims.

What is claimed is:

1. A reduced noise reluctance machine comprising:
   a stator, the stator defining an outer surface, the stator having opposed first and second ends; and
   a first endshield, the endshield defining a ledge having a first surface and a second surface where the first surface is substantially perpendicular to the second surface, the ledge extending around the perimeter of the first endshield;
   wherein the stator is positioned with respect to the first endshield such that the first end of the stator sealingly engages the perimeter of the first surface of the ledge and the second surface of the ledge mates with the outer surface of the stator so as to reduce air flow, and thus, reduce noise in the reluctance machine.

2. The reduced noise reluctance machine of claim 1 wherein the outer surface of the stator includes both relatively straight regions and relatively curved regions.

3. The reluctance machine of claim 1 further including a second end-shield, the second endshield defining a cavity having a third surface and a fourth surface where the third surface is substantially perpendicular to the fourth surface; and
   wherein the stator is positioned with respect to the second endshield such that the outer surface of the second end of the stator mates with both the third and fourth surfaces.

4. A terminal housing for coupling the terminal ends of a plurality of phase windings of an electric machine to a source of electric power, the electric machine including a stator, the terminal housing comprising:
   a central portion defining a plurality of hollow cavities, the hollow cavities adapted to receive the terminal ends of the phase windings;
   at least one projecting leg projecting outward from the central portion in a first directions, the projecting leg adapted to receive a first portion of the stator;
   a first wing member extending from the central portion where the first wing member extends in a direction substantially perpendicular to the first direction; and
   a positioning tab that extends from the central portion, where the positioning tab is adapted to receive a second portion of the stator so as to position the terminal housing in a given arrangement with respect to the electric machine.

5. The terminal housing of claim 4 wherein the terminal housing is formed from plastic.

6. The terminal housing of claim 4 wherein the electric machine includes a stator and the positioning tab includes a notched region that is adapted to receive the stator of the machine.

7. The terminal housing of claim 4 further comprising a plurality of crush ribs extending outwardly from a surface of the positioning tab.

8. The terminal housing of claim 4 further comprising a second wing member extending from the central portion where the second wing member extends in a direction substantially opposite to the direction in which the first wing member extends.

9. The terminal housing of claim 4 wherein the stator includes at least two stator poles defining an interpole gap therebetween, and wherein the projecting leg is adapted to fit into the interpole gap.

10. An electric machine comprising:
    a stator having first and second ends;
    at least one phase winding wound about the stator, the phase winding including end-turn portions that extend outside of the first and second ends of the stator and end terminals;
    a terminal housing connected to the first end of the stator for coupling the terminal ends of the phase winding to a source of electric power, the terminal housing comprising a central portion defining a hollow cavity, where the terminal ends of the phase winding are positioned within the hollow cavity and a first wing member extending from the central portion, wherein the terminal housing is positioned relative to the stator such that the first wing member extends above and is coupled to at least one end-turn portion, the terminal housing further comprising a positioning tab extending from the central region of the terminal housing and engaging the first end of the stator.

11. The electric machine of claim 10 further including a second wing member that extends from the central portion where the second wing member extends in a direction substantially opposite to the direction in which the first wing member extends.

12. The reluctance machine of claim 10 wherein the first wing member is coupled to the at least one end-turn portion by flexible ties.

13. The reluctance machine of claim 10 wherein the stator defines a plurality of projecting stator poles and inter-pole projections and wherein the terminal housing includes at least one positioning leg where the positioning leg is positioned within an inter-polar region.

14. The reluctance machine of claim 10 further comprising an endshield, where the endshield is secured to the stator and where the endshield defines a passage through which the central region of the terminal housing passes.

15. The reluctance machine of claim 14 further comprising a dust cover that is coupled to the endshield, wherein the dust cover defines a passage through which the central region of the terminal housing passes.

16. The reluctance machine of claim 15 wherein the passage in the dust cover is defines by a plurality of projecting flexible elements, separated by slits.

17. A dust cover for a reluctance machine, the reluctance machine including a rotor coupled to a shaft, an end shield defining an opening through which the shaft extends, a phase winding and a projecting terminal housing for connecting electric power to the phase winding, the dust cover comprising:

a cover member adapted to be secured to the end shield so as to cover the opening;

a first passage extending through the cover member adapted to allow a portion of the projecting terminal housing to extend therethrough; and a first flexible member having a plurality of slits therein, the first flexible member situated within the first passage and adapted to engage the projecting terminal housing extending through the first passage.

18. The dust cover of claim 17 further comprising:

a second passage extending through the cover member, the second passage adapted to allow a portion of a plug to extend therethrough, and a second flexible member having a plurality of slits therein, the second flexible member situated within the second passage and adapted to engage the plug extending through the second passage.

19. A reluctance machine comprising:

a stator defining a plurality of inwardly projecting stator poles, where the projecting stator poles define inter-pole regions between the stator poles and a central bore, and where each stator pole terminates in a region defining a concave surface, where the concave surface has a given radius of curvature, said stator having first and second ends;

at least one phase winding having a winding coil that is wound about at least one of the stator poles, where portions of the winding coil are positioned in at least one inter-polar region, and where the portion of the winding coil includes an outer surface facing the central bore, the phase winding including end-turn portions that extend outside of the first and second ends of the stator and end terminals;

a plurality of contoured top-sticks positioned within the inter-polar regions on the outer surface of the portion of the winding coil, wherein the contoured top-stick has an outer concave surface where the radius of curvature of the top-stick's outer surface is substantially the same as the given radius of curvature;

a terminal housing for coupling the terminal ends of the phase winding to a source of electric power, the terminal housing comprising a central portion defining a hollow cavity, where the end terminals of the phase winding are positioned within the hollow cavity and first and second wing members extending in opposite directions from the central portion wherein the terminal housing is positioned such that the first and second wing members extend across and are coupled to at least one end-turn portion;

a first endshield, the first endshield defining a cavity having a first surface and a second surface where the first surface is substantially perpendicular to the second surface, wherein the stator is positioned with respect to the first endshield such that the outer surface of the first end of the stator mates with both the first and second surfaces;

a second end-shield, the second endshield, the second endshield defining a cavity having a third surface and a fourth surface where the third surface is substantially perpendicular to the fourth surface; wherein the stator is positioned with respect to the second endshield such that the outer surface of the second end of the stator mates with both the third and fourth surfaces and wherein the second endshield defines a passage through which the central region of the terminal housing passes; and a dust cover that is coupled to the endshield, wherein the dust cover defines a passage through which the central region of the terminal housing passes wherein the passage in the dust cover is defines by a plurality of projecting flexible elements separated by slits.

20. The reluctance machine of claim 19 wherein each of the stator poles defines tang members that extend into the inter-pole regions adjacent the stator pole, wherein the contoured top-stick includes a central portion defining the concave surface and two outwardly extending portions, wherein each of the outwardly extending portions defines a notch, and wherein the top-stick is positioned such that the notches receive tangs from the stator poles that define the inter-polar region within which the top-stick is positioned.

21. The reluctance machine of claim 19 wherein the top-stick is formed of plastic.

* * * * *